Figure 1:
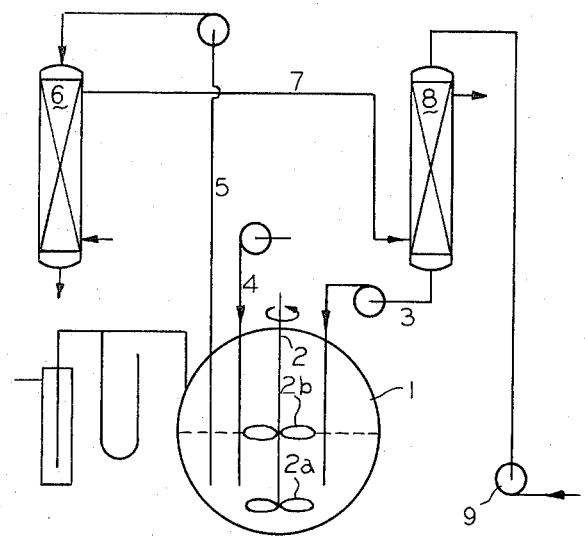

United States Patent [19]

Bosche et al.

[11] 3,872,170

[45] Mar. 18, 1975

[54] CONTINUOUS MANUFACTURE OF AN AQUEOUS CHOLINE CHLORIDE SOLUTION

[75] Inventors: Horst Bosche; Uwe Soenksen, both of Ludwigshafen, Germany

[73] Assignee: Badische Anilin & Soda-Fabrik Aktiengesellschaft, Ludwigshafen/Rhine, Germany

[22] Filed: Mar. 23, 1972

[21] Appl. No.: 237,321

[30] Foreign Application Priority Data
Mar. 29, 1971 Germany ........................2115094

[52] U.S. Cl.......................................... 260/567.6 M
[51] Int. Cl.............................................. C07c 91/06
[58] Field of Search ........................... 260/567.6 M

[56] References Cited
UNITED STATES PATENTS
2,870,198    1/1959    Klein et al................... 260/567.6 M FOREIGN PATENTS OR APPLICATIONS
1,060,256    3/1967    Great Britain .............. 260/567.6 M

*Primary Examiner*—Donald G. Daus
*Assistant Examiner*—D. B. Springer
*Attorney, Agent, or Firm*—Johnston, Keil, Thompson & Shurtleff

[57] ABSTRACT

Manufacture of choline chloride from trimethylammonium chloride and ethylene oxide in liquid phase, wherein discoloration of the reaction mixture is obviated by continuously bathing the walls of the reaction vessel above the level of the liquid therein.

7 Claims, 3 Drawing Figures

CONTINUOUS MANUFACTURE OF AN AQUEOUS CHOLINE CHLORIDE SOLUTION

This invention relates to a process for manufacturing choline chloride by reaction of trimethylammonium chloride and ethylene oxide in the liquid phase, and, more particularly, to such a process carried out continuously in a manner which obviates discoloration of the reaction product.

The best way of manufacturing choline chloride, i.e., trimethyloxyethylammonium chloride, is at present regarded to be the reaction of trimethylammonium chloride with ethylene oxide.

As far as we know, U.K. Pat. No. 1,060,256 describes for the first time a process permitting the continuous reaction of trimethylammonium chloride with ethylene oxide. The said patent states that one of the main difficulties in the continuous reaction is the uncontrollable formation of by-products, as manifested by a brown discoloration of the reaction mixture. According to said U.K. patent, this problem is solved by preventing the formation of a gas space above the liquid reaction mixture.

On an industrial scale, the proposal to operate without a gas space above the liquid reaction mixture normally means that the reaction must be carried out under pressure. According to said U.K. patent, the pressure may be from 5 to 20 atmospheres.

In the process described in said patent, the reaction mixture obtained after passing through a second reaction stage is concentrated in an evaporator where some of the water evaporates off and the physically dissolved excess ethylene oxide is simultaneously removed.

It is obvious that the use of pressure apparatus with its own well-known special problems constitutes a drawback for the continuous manufacture of choline chloride. The necessity for the removal of the ethylene oxide and some of the water from the reaction mixture leaving the reaction is a further drawback of the process where it is possible to start from a highly concentrated trimethylammonium chloride solution. Such 50–75% w/w trimethylammonium chloride solutions are easy to produce and are in fact inducive to execution of the said reaction in particularly small and economical equipment.

It is an object of the invention to provide a process which makes it possible to prepare substantially colorless and highly concentrated solutions of choline chloride from highly concentrated trimethylammonium chloride solutions at atmospheric pressure and with a minimum amount of apparatus. In is an essential sales requirement of choline chloride that it be colorless and possess a high degree of purity, since it is widely used as an additive for animal feedstuffs for example.

In accordance with the present invention these and other objects and advantages are achieved in an improved process for the manufacture of choline chloride by reacting excess ethylene oxide with trimethylammonium chloride in aqueous solution at a temperature of from 30° to 100°C in a closed stirred vessel in which a gas space is present above the level of the liquid reaction mixture, with, if necessary, further reaction stages serving to complete the reaction or to purify the reaction mixture, the improvement comprising operating at substantially atmospheric pressure and continuously bathing the surfaces defining the gas space in the stirred vessel with the reaction mixture or with fresh trimethylammonium chloride solution.

In a particularly advantageous embodiment of this process, the reaction mixture obtained from this first reaction stage, which substantially comprises only one stirred vessel, is passed to a second reaction stage in which the reaction is completed and the unreacted ethylene oxide is removed from the reaction mixture within a period of not more than 30 minutes and at a temperature of from 40° to 90°C by means of an inert gas, which gas is subsequently washed with fresh trimethylammonium chloride solution, Since the reaction takes place at virtually atmospheric pressure, it may be effected in almost any closed stirred vessel, provided it is of a material suitable for a reaction with trimethylammonium chloride.

As described below in detail, it is merely necessary to ensure that a stirrer or other suitable means constantly directs part of the liquid present in the reaction vessel or the freshly introduced trimethylammonium chloride solution onto the free walls of the reaction vessel including the cover. Care must be taken to ensure that every element of the internal surface of the reaction vessel which is directly exposed to the gas space is bathed by the liquid at least at regular intervals, say, at least every 10 seconds, as otherwise a brown condensate will form at these points and this will pass into the reaction solution to cause discoloration thereof.

The starting solution is conveniently a from 50 to 75% w/w and in particular from 68 to 72% w/w aqueous trimethylammonium chloride solution and this is maintained at a reaction temperature of from 30° to 100°C and preferably from 50° to 70°C in the stirred vessel, where an ethylene oxide partial pressure of from about 0.5 to 2 atmospheres and in particular from 0.8 to 1.5 atmospheres is maintained. The total pressure is from substantially atmospheric pressure to from about 2 to 3 atmospheres gage. The ethylene oxide used should be at least 99.8% pure and the trimethylamine used for preparing the ammonium chloride solution should be at least 99% pure. It is convenient to operate at a residence time in the stirred vessel of from 30 to 150 minutes and preferably from 60 to 90 minutes. The most convenient length of the residence is governed by the dimensions of the vessel and also by the ethylene oxide partial pressure, low partial pressures requiring relatively long residence times and vice versa. When determining the most suitable residence time it should be assumed that the degree of conversion in the vessel should be at least 99%.

Figure 3:
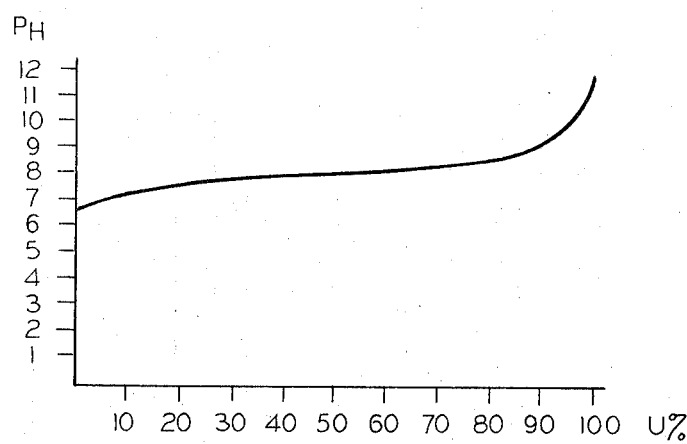

To this end, it is advantageous to make use of the well-known fact that, as may be seen from FIG. 3, the pH is relatively independent of conversion at conversions U ranging from 10 to 90%. The rise of pH within this range of conversion is from about 7 to approximately 8–8.8. Above 90% the pH increases steeply and achieves a value of about 12 at a conversion of approximately 100%. Since the reaction is carried out at virtually atmospheric pressure, there is no difficulty in inserting a suitable measuring device such an electrode cascade into the stirred vessel of the invention for continuous measurement of the pH. The reaction is conveniently carried out in such a manner that the pH in the reaction chamber is between 11 and 12 so as to maintain a conversion of between 99 to 100%.

Assuming that use is made of the aforementioned second reaction stage in which excess ethylene oxide is removed, the reaction is preferably carried out as follows (see FIG. 1): a stirred vessel 1 is used whose stirrer 2 has not only a stirring element 2a for stirring the liquid but also a second stirring element 2b which is located at or near the surface of the liquid and is designed to splash liquid against the walls of the gas space in the reaction vessel. Trimethylammonium chloride solution laden with a certain amount of ethylene oxide from the purifying stage to be described below is fed via line 3 to the reactor where it is maintained at a temperature of from 30° to 100°C. At the same time, ethylene oxide is fed through another line 4, conveniently directly into the liquid in the reaction chamber, at such a rate that a stoichiometric excess of ethylene oxide of from about 2 to 18% and preferably from 4 to 10% molar is present. This excess substantially constitutes the ethylene oxide physically dissolved in the reaction solution. Thus the excess amount of ethylene oxide is directly connected with the ethylene oxide partial pressure prevailing in the gas space of the reactor. For a given excess of ethylene oxide there is automatically produced a corresponding ethylene oxide pressure. An average residence time of from 60 to 210 minutes is maintained, while the reaction mixture is withdrawn via line 5 at the same rate as that at which fresh reaction solution is fed to the vessel, and the withdrawn reaction solution is conveniently maintained at an elevated temperature, in particular at a temperature of from 40° to 90°C, and fed to a packed column 6 constituting the second reaction stage, this being operated at substantially atmospheric pressure. The liquid passes downwardly through the column while nitrogen forms the chemically inert gas which is passed upwardly therethrough. This secondary reactor is preferably in the form of a falling film column but it may, if desired, contain other elements to assist the transfer of material. It achieves a number of ends in an advantageous manner. Whereas the stirred vessel used for the main reaction operates with complete back-mixing of its contents, the falling film column may be regarded as a reactor which operates substantially free from back-mixing. The reaction mixture leaving the stirred vessel usually contains no more trimethylammonium chloride in detectable amounts but it contains from 0.1 to 2% by weight of trimethylamine, from 1 to 2% by weight of ethylene oxide and from 0.1 to 0.5% by weight of ethylene chlorohydrin. The content of ethylene glycol is less than 0.1% by weight. The solution is freed from the first three of these impurities virtually completely in the falling film column in a single operation. This is achieved by the double function of the column: the fact that the column acts as a reactor means that ethylene chlorohydrin is completely reacted with trimethylamine or water and thus rendered harmless. Ethylene oxide and any residual trimethylamine are removed in the manner already described by the transfer action of the column.

Recovery of the ethylene oxide removed with the nitrogen may be effected in the usual manner by washing out the ethylene oxide-containing gas in a conventional absorption apparatus 8, which may for example also be a falling film column, with fresh trimethylammonium chloride solution 9. To avoid the accumulation of by-products present in amounts below the normal detection limit, it is convenient not to carry this washing process to complete removal of the ethylene oxide but to wash out only about 40–80% of the theoretically recoverably amount; the trimethylammonium chloride solution used as wash liquid is then used as starting material for the process.

There is finally obtained a from 60 to 80% solution of choline chloride which generally has a pH of from about 11 to 12 as measured directly (from about pH 9 to 10 when extrapolated to infinite dilution) and may be further concentrated or diluted or worked up to solid choline chloride or used in some other way.

Figure 2:
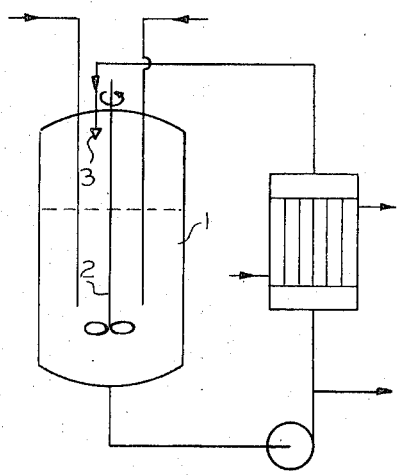

In a particular embodiment, which is illustrated in FIG. 2 and which does not affect the course of the manufacturing process in other respects, the surfaces defining the gas space of the stirred vessel 1 are not splashed with liquid by the stirrer 2 of the vessel but an atomizing device 3 located in said gas space.

It will be appreciated that mixing of the contents of the reactor with the two continuously introduced reactants must be sufficiently thorough to achieve the best possible reaction conditions. If, as indicated in FIG. 2, a cooling cycle is provided, it may be possible to dispense with a mechanical stirrer for agitating the reactor contents if the shape of the reaction vessel is appropriate and the rate of circulation is sufficiently high. In this case the reactants are fed to a point of high velocity of flow in the external path of the circulating liquid.

EXAMPLE

The apparatus used is the same as that illustrated in FIG. 1, which may be readily reproduced on any desired scale by selecting appropriate dimensions.

The reactor consists of a spherical glass vessel 1 having a capacity of 10 liters and provided with a total of six connecting points. It is equipped with two high-speed paddle stirrers mounted on a single shaft 2 at different heights. One of said stirrers 2a is mounted at the bottom of the shaft and serves the purpose of thoroughly mixing the contents of the reactor with the fresh reactants. The other stirrer 2b is situated at about the level of the surface of the liquid and constantly splashes liquid onto the free internal surface of the flask.

Tubes dipping below the surface of the liquid pass through three of the connecting points, two of these tubes being close to the lower stirrer, one on each side of the stirrer shaft. Under operating conditions, trimethylammonium chloride solution and liquid ethylene oxide are continuously introduced via pumps (3 and 4 respectively), whilst the reaction solution is continuously pumped off at an equivalent rate through the third of these tubes so as to keep the liquid at a constant level. The withdrawn liquid passes through a glass pipe 5 to the top of a falling film column 6.

Two of the remaining three connecting points are used for the introduction of a temperature measuring device and a pH electrode, whilst the third is connected to a manometer and a mercury-type safety valve or some other safety valve of appropriate limiting pressure.

The falling film column 6 consists of a glass tube having a length of 2 meters and an internal diameter of 60 mm and is packed with 3 mm glass Raschig rings. To compensate for heat losses, the column is surrounded by a heating bath which is in turn surrounded by insulating means. The internal temperature is measured at 4 points down the length of the column. At the bottom and top of the column there is an inlet and outlet respectively for the stripping gas. The stripping gas laden with volatiles passes from the stripper through a pipe 7 of glass to the bottom of absorption column 8 consisting of a glass tube having a length of 1 meter and an internal diameter of 60 mm and also packed with 3 mm Raschig rings. This column is neither heated nor insulated. The impoverished stripping gas leaves the apparatus through an outlet at the top of the absorption column. A metering pump 9 conveys fresh trimethylammonium chloride solution to the top of the absorption column and a further pump 3 meters the laden solution from the bottom of the absorber to the reactor.

To start the process, the reactor is filled with 5 liters of an aqueous 77% choline chloride solution, the stirrers are set in motion and the contents of the vessel are heated to 65°C by external heating comprising a circulation of hot water. The gas space is purged with nitrogen, and then 250 ml of ethylene oxide are pumped into the reactor over about 5 minutes. This vaporizes and completely displaces the nitrogen, which escapes from the gas space through the safety valve. The ethylene oxide pressure in the reactor is then from 0.1 to 0.2 atmospheres gage depending on the limiting pressure of the safety valve. There are then continuously passed, via the absorption column, 250 l/hr (= 2.56 kg/hr) of a 70% w/w aqueous trimethylammonium chloride solution to the reactor and 3.16 l/hr (= 3.41 kg/hr) of reaction solution are pumped from the reactor to the top of the stripping column. At the same time, ethylene oxide is metered at such a rate that the ethylene oxide pressure set up at the commencement of operations is held constant. The consumption of ethylene oxide is 0.96 l/hr (= 0.855 kg/hr). The temperature in the stirred vessel is kept at 65°C by cooling with running water. The residence time of the mixture in the reactor is about 90 minutes, as is readily calculated from the contents and throughput. The pH indicated is 11.5, this corresponding to a corrected pH of 10.0.

The stripping column is maintained at an internal temperature of 65°C and the nitrogen rate therethrough is 80 l/hr (STP), and this nitrogen entrains the volatiles of the reaction solution to the bottom of the absorption column, in which the trimethyl-ammonium chloride solution absorbs about 60% of said volatiles. The remainder escapes with the stripping gas (nitrogen) at the top of the absorber as off-gas.

From the bottom of the stripping column there flow 3.39 kg/hr of a 77% w/w aqueous choline chloride solution in virtually quantitative yield. The content of ethylene chlorohydrin or ethylene glycol in said solution is below the limit of analytical detectability of 0.1% by weight in each case. The solution contains trimethylammonium chloride and free trimethylamine in concentrations of less than 0.04% by weight in each case and the concentration of ethylene oxide is not more than 0.01% by weight. The color number of the solution is 15 APHA and its corrected pH is 10.0.

We claim:

1. In a continuous process for the manufacture of choline chloride by reacting excess ethylene oxide with trimethylammonium chloride in aqueous solution at a temperature of from 30° to 100°C in a closed stirred vessel in which a gas space is present above the level of the liquid reaction mixture, the improvement comprising operating at substantially atmospheric pressure and continuously bathing the surfaces defining the gas space in the stirred vessel with the reaction mixture or with fresh trimethylammonium chloride solution.

2. A process as claimed in claim 1, wherein, in a second reaction stage, the unreacted ethylene oxide is removed from the reaction mixture over a period of not more than 30 minutes and at a temperature of from 40° to 90°C by stripping with an inert gas, which gas is then washed with fresh trimethylammonium chloride solution for absorption of ethylene oxide from the gas.

3. A process as claimed in claim 1, wherein the trimethylammonium chloride is used as a from 50 to 75% w/w aqueous solution.

4. A process as claimed in claim 1, wherein the reaction is carried out at from 50° to 70°c.

5. A process as claimed in claim 1, wherein an ethylene oxide partial pressure of from 0.5 to 2 atmospheres is maintained.

6. A process as claimed in claim 1, wherein the residence time in the stirred vessel is from 30 to 150 minutes.

7. A process as claimed in claim 1, wherein the reaction pressure is from about 1 to 4 atmospheres absolute.

* * * * *